(12) United States Patent
Li et al.

(10) Patent No.: US 10,827,156 B2
(45) Date of Patent: Nov. 3, 2020

(54) LIGHT FILLING METHOD AND APPARATUS FOR PHOTOGRAPHING ENVIRONMENT, AND COMPUTER-READABLE STORAGE MEDIUM

(71) Applicant: BEIJING XIAOMI MOBILE SOFTWARE CO., LTD., Beijing (CN)

(72) Inventors: Guosheng Li, Beijing (CN); Chuan Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/437,552

(22) Filed: Jun. 11, 2019

(65) Prior Publication Data
US 2019/0379872 A1 Dec. 12, 2019

(30) Foreign Application Priority Data

Jun. 11, 2018 (CN) .......................... 2018 1 0593003

(51) Int. Cl.
*H04N 9/77* (2006.01)
*H04N 5/235* (2006.01)
*H04N 9/73* (2006.01)

(52) U.S. Cl.
CPC ............. *H04N 9/77* (2013.01); *H04N 5/2351* (2013.01); *H04N 9/73* (2013.01)

(58) Field of Classification Search
CPC .......... H04N 9/77; H04N 5/2351; H04N 9/73; H04N 5/2256; H04N 5/2354
See application file for complete search history.

(56) References Cited

U.S. PATENT DOCUMENTS

| 2015/0002735 A1* | 1/2015 | Moskovchenko | ... H04N 5/2256 348/370 |
|---|---|---|---|
| 2015/0189138 A1 | 7/2015 | Xie et al. | |
| 2017/0134625 A1* | 5/2017 | Salazar | ..................... G06T 7/90 |

FOREIGN PATENT DOCUMENTS

| CN | 104113688 A | 10/2014 |
|---|---|---|
| CN | 104580922 A | 4/2015 |
| CN | 104581099 A | 4/2015 |
| CN | 105744174 A | 7/2016 |

(Continued)

OTHER PUBLICATIONS

Combined Chinese Office Action and Search Report dated May 12, 2020 in corresponding Chinese Patent Application No. 201810593003.9 (with English Translation), 17 pages.

*Primary Examiner* — Nicholas G Giles
(74) *Attorney, Agent, or Firm* — Oblon, McClelland, Maier & Neustadt, L.L.P.

(57) ABSTRACT

The present disclosure relates to a light filling method and apparatus for photographing environment, and a computer-readable storage medium. The method includes detecting a color temperature value of a current photographing environment to obtain a first color temperature value; and displaying an optimal light filling image acquired from a plurality of prestored light filling images in a light filling region of a display screen based on the first color temperature value, to implement light filling for the photographing environment, wherein the optimal light filling image is a light filling image that does not destroy white balance of a camera after light filling is implemented for the photographing environment.

18 Claims, 9 Drawing Sheets

(56) References Cited

FOREIGN PATENT DOCUMENTS

| CN | 105827988 A | 8/2016 |
|---|---|---|
| CN | 106101569 A | 11/2016 |
| CN | 108012134 A | 5/2018 |
| WO | WO 2017/082991 A1 | 5/2017 |

* cited by examiner

LIGHT FILLING METHOD AND APPARATUS FOR PHOTOGRAPHING ENVIRONMENT, AND COMPUTER-READABLE STORAGE MEDIUM

CROSS-REFERENCE TO RELATED APPLICATIONS

This application is based upon and claims priority to Chinese Patent Application No. 201810593003.9, filed on Jun. 11, 2018, the entire contents of which are incorporated herein by reference.

TECHNICAL FIELD

The present disclosure relates to the technical field of terminals, and in particular, relates to a light filling method and apparatus for photographing environment, and a computer-readable storage medium.

BACKGROUND

With the development of terminal technologies, smart terminals have more and more functions. For example, a user may implement video communications, photographing and the like operations via a front camera of a smart terminal. However, when a current environment of the user is dim, the front camera of the smart terminal may not take ideal pictures due to insufficient exposure. Therefore, when the user is taking pictures in a dim place via the front camera of the smart terminal, light filling generally needs to be performed for the photographing environment.

In the related art, when the light is dim, the smart terminal may directly increase the luminance of the display screen to three times of the current luminance; or turn the background of the display screen into pure white; or arrange an independent soft light in the vicinity of the front camera of the smart terminal and light on the soft light when it is necessary to implement light filling for the photographing environment.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a light filling method for a photographing environment. The method includes detecting a color temperature value of a current photographing environment to obtain a first color temperature value; and displaying an optimal light filling image acquired from a plurality of prestored light filling images in a light filling region of a display screen based on the first color temperature value, to implement light filling for the photographing environment, wherein the optimal light filling image is a light filling image that does not destroy white balance of a camera after light filling is implemented for the photographing environment.

According to an aspect, when displaying the optimal light filling image, the method includes determining a light filling color temperature range corresponding to the first color temperature value; acquiring any one light filling image with the color temperature value falling within the light filling color temperature range from the plurality of light filling images; displaying the acquired light filling image in the light filling region, and detecting the color temperature value of the photographing environment to obtain a second color temperature value after displaying the acquired light filling image in the light filling region; selecting at least one light filling image not displayed in the light filling region in the light filling process from the plurality of light filling images when the second color temperature value does not match a target color temperature value, wherein the target color temperature value is a color temperature value that does not destroy the white balance of the camera; and acquiring any one light filling image with the color temperature value falling within the light filling color temperature range from the selected light filling images, and returning to the operation of displaying the acquired light filling image in the light filling region, until the second color temperature value matches the target color temperature value.

According to another aspect, after detecting the color temperature value of the photographing environment to obtain the second color temperature value, the method includes acquiring a color temperature value difference between the second color temperature value and the target color temperature value; determining that the second color temperature value matches the target color temperature value when the color temperature value difference is less than or equal to a predefined difference; and determining that the second color temperature value does not match the target color temperature value when the color temperature value difference is greater than the predefined difference.

According to yet another aspect, when displaying the optimal light filling image, the method includes acquiring a first light filling image from the plurality of light filling images, wherein the first light filling image is any one light filling image of the plurality of light filling images; displaying the first light filling image in the light filling region as a target light filling image, and detecting the color temperature value of the photographing environment to obtain a second color temperature value after displaying the target light filling image in the light filling region; acquiring a second light filling image from the plurality of light filling images by means of interpolation based on the second color temperature value, a target color temperature value and a color temperature value of the target light filling image, when the second color temperature value does not match the target color temperature value, wherein a color temperature value of the second light filling image is not equal to the color temperature value of the target light filling image, and the target color temperature value is a color temperature value that does not destroy the white balance of the camera; and displaying the second light filling image in the light filling region as the target light filling image, and returning to the operation of detecting the color temperature value of the photographing environment after displaying the target light filling image in the light filling region, until the second color temperature value matches the target color temperature value.

According to yet another aspect, after detecting the color temperature value of the photographing environment to obtain the second color temperature value, the method further includes acquiring a color temperature value difference between the second color temperature value and the target color temperature value; determining that the second color temperature value matches the target color temperature value when the color temperature value difference is less than or equal to a predefined difference; and determining that the second color temperature value does not match the target color temperature value when the color temperature value difference is greater than the predefined difference.

According to yet another aspect, when displaying the optimal light filling image, the method includes displaying the plurality of light filling images; displaying a light filling image selected based on the select instruction in the light filling region, and detecting the color temperature value of the photographing environment to obtain a second color temperature value after displaying the light filling image selected based on the select instruction, upon receipt of a select instruction based on the plurality of light filling images; displaying prompt information when the second color temperature value does not match a target color temperature value, wherein the prompt information is used to prompt re-choice of the light filling image, and the target color temperature value is a color temperature that does not destroy the white balance of the camera; and returning to the operation of displaying the plurality of light filling images, until the second color temperature value matches the target color temperature value, upon receipt of a re-choose instruction.

According to yet another aspect, after detecting the color temperature value of the photographing environment to obtain the second color temperature value, the method further includes acquiring a color temperature value difference between the second color temperature value and the target color temperature value; determining that the second color temperature value matches the target color temperature value when the color temperature value difference is less than or equal to a predefined difference; and determining that the second color temperature value does not match the target color temperature value when the color temperature value difference is greater than the predefined difference.

According to yet another aspect, after detecting the color temperature value of the current photographing environment to obtain the first color temperature value, the method further includes acquiring a region size corresponding to the first color temperature value from a stored corresponding relationship between color temperature values and region sizes; and setting a light filling region with a size being the region size in the display screen.

Aspects of the disclosure also include a light filling apparatus for a photographing environment. The light filling apparatus includes a processor and a memory configured to store instructions executable by the processor. The processor is configured to detect a color temperature value of a current photographing environment to obtain a first color temperature value; and display an optimal light filling image acquired from a plurality of prestored light filling images in a light filling region of a display screen based on the first color temperature value, to implement light filling for the photographing environment, wherein the optimal light filling image is a light filling image that does not destroy white balance of a camera after light filling is implemented for the photographing environment.

Aspects of the disclosure also includes a non-transitory computer-readable storage medium having stored therein instructions that, when executed by a processor, causes a device to perform a light filling method for a photographing environment. The method includes detecting a color temperature value of a current photographing environment to obtain a first color temperature value; and displaying an optimal light filling image acquired from a plurality of prestored light filling images in a light filling region of a display screen based on the first color temperature value, to implement light filling for the photographing environment, wherein the optimal light filling image is a light filling image that does not destroy white balance of a camera after light filling is implemented for the photographing environment.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations described in the following exemplary aspects are not representative of all implementations consistent with the present disclosure. Rather, they are merely examples of apparatuses and methods consistent with some aspects of the present disclosure as detailed in the appended claims.

Before the aspects of the present disclosure are interpreted and illustrated in detail, application scenarios of the aspects of the present disclosure are firstly interpreted and illustrated.

At present, a user may implement video communications, photographing and the like operations via a front camera of a smart terminal. However, when a current environment of the user is dim, light filling generally needs to be performed for the photographing environment to take ideal pictures. However, when the smart terminal is performing light filling, the luminance of the display screen of the smart terminal is generally increased to three times of the current luminance; or the background of the display screen is turned into pure white; or an independent soft light arranged in the vicinity of the front camera of the smart terminal is lighted. Since the operation of increasing the luminance of the display screen or turning the background into white may cause the luminance of the filling light to be too high or insufficient, such that accuracy of light filling is low. In addition, white balance of the camera may be destroyed. In addition, when light filling is performed by the additional soft light, cost of light filling is increased.

Based on such scenario, aspects of the present disclosure provide a light filling method for a photographing environment which may improve the accuracy of light filling.

Figure 1:
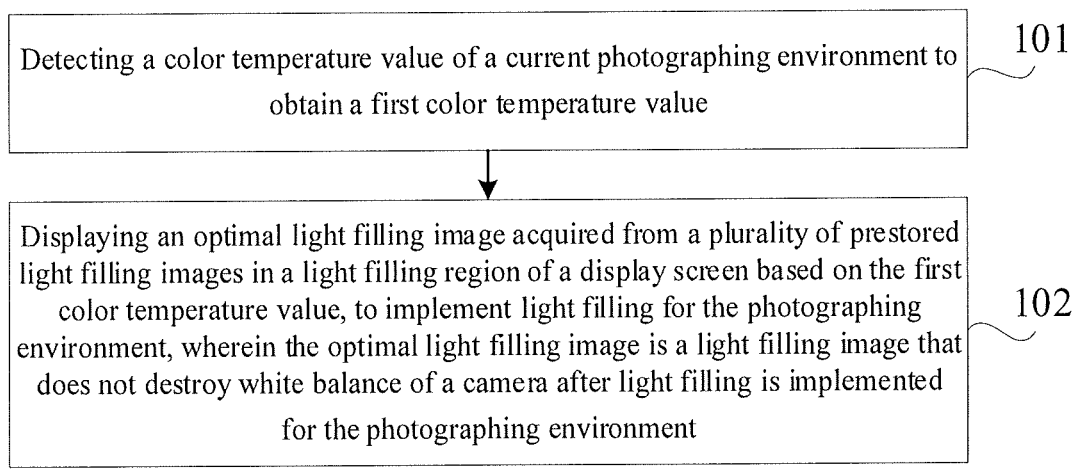
FIG. 1 is a flowchart of a light filling method for a photographing environment according to an exemplary aspect of the resent disclosure.

FIG. 1 is a flowchart of a light filling method for a photographing environment according to an exemplary aspect. As illustrated in FIG. 1, the method is applied to a smart terminal, and includes the following steps:

In step 101, detecting a color temperature value of a current photographing environment to obtain a first color temperature value.

In step 102, displaying an optimal light filling image acquired from a plurality of prestored light filling images in a light filling region of a display screen based on the first color temperature value, to implement light filling for the photographing environment, wherein the optimal light filling image is a light filling image that does not destroy white balance of a camera after light filling is implemented for the photographing environment.

In the aspect of the present disclosure, the color temperature value of the photographing environment may be detected to obtain the first color temperature value, the optimal light filling image may be acquired based on the first color temperature value, and the optimal light filling image is displayed in the light filling region of the display screen. Since the optimal light filling image is the light filling image that does not destroy the white balance of the camera after light filling is implemented for the photographing environment, after the optimal light filling image is displayed in the light filling region, light filling is implemented for the photographing environment, and the accuracy and effect of the light filling for the environment are improved. In addition, the white balance of the camera may not be destroyed.

In some aspects, the displaying an optimal light filling image acquired from a plurality of prestored light filling images in a light filling region of a display screen based on the first color temperature value includes:

determining a light filling color temperature range corresponding to the first color temperature value;

acquiring any one light filling image with the color temperature value falling within the light filling color temperature range from the plurality of light filling images;

displaying the acquired light filling image in the light filling region, and detecting the color temperature value of the photographing environment to obtain a second color temperature value after displaying the acquired light filling image in the light filling region;

selecting at least one light filling image not displayed in the light filling region in the light filling process from the plurality of light filling images when the second color temperature value does not match a target color temperature value, wherein the target color temperature value is a color temperature value that does not destroy the white balance of the camera; and acquiring any one light filling image with the color temperature value falling within the light filling color temperature range from the selected light filling images, and returning to the operation of displaying the acquired light filling image in the light filling region, until the second color temperature value matches the target color temperature value.

In some aspects, the displaying an optimal light filling image acquired from a plurality of prestored light filling images in a light filling region of a display screen based on the first color temperature value includes:

acquiring a first light filling image from the plurality of light filling images, wherein the first light filling image is any one light filling image of the plurality of light filling images;

displaying the first light filling image in the light filling region as a target light filling image, and detecting the color temperature value of the photographing environment to obtain a second color temperature value after displaying the target light filling image in the light filling region;

acquiring a second light filling image from the plurality of light filling images by means of interpolation based on the second color temperature value, a target color temperature value and a color temperature value of the target light filling image, when the second color temperature value does not match the target color temperature value, wherein a color temperature value of the second light filling image is not equal to the color temperature value of the target light filling image, and the target color temperature value is a color temperature value that does not destroy the white balance of the camera; and displaying the second light filling image in the light filling region as the target light filling image, and returning to the operation of detecting the color temperature value of the photographing environment after displaying the target light filling image in the light filling region, until the second color temperature value matches the target color temperature value.

In some aspects, the displaying an optimal light filling image acquired from a plurality of prestored light filling images in a light filling region of a display screen based on the first color temperature value includes:

displaying the plurality of light filling images;

displaying a light filling image selected based on the select instruction in the light filling region, and detecting the color temperature value of the photographing environment to obtain a second color temperature value after displaying the light filling image selected based on the select instruction, upon receipt of a select instruction based on the plurality of light filling images;

displaying prompt information when the second color temperature value does not match a target color temperature value, wherein the prompt information is used to prompt re-choice of the light filling image, and the target color temperature value is a color temperature that does not destroy the white balance of the camera; and returning to the operation of displaying the plurality of light filling images, until the second color temperature value matches the target color temperature value, upon receipt of a re-choose instruction.

In some aspects, after the detecting the color temperature value of the photographing environment to obtain a second color temperature value, the method further includes:

acquiring a color temperature value difference between the second color temperature value and the target color temperature value;

determining that the second color temperature value matches the target color temperature value when the color temperature value difference is less than or equal to a predefined difference; and determining that the second color temperature value does not match the target color temperature value when the color temperature value difference is greater than the predefined difference.

In some aspects, after the detecting a color temperature value of a current photographing environment to obtain a first color temperature value, the method further includes:

acquiring a region size corresponding to the first color temperature value from a stored corresponding relationship between color temperature values and region sizes; and setting a light filling region with a size being the region size in the display screen.

All of the selectable technique solutions described above, may be selected in any combination to form alternative aspects of the present disclosure, and will not be described again herein.

Figure 2:
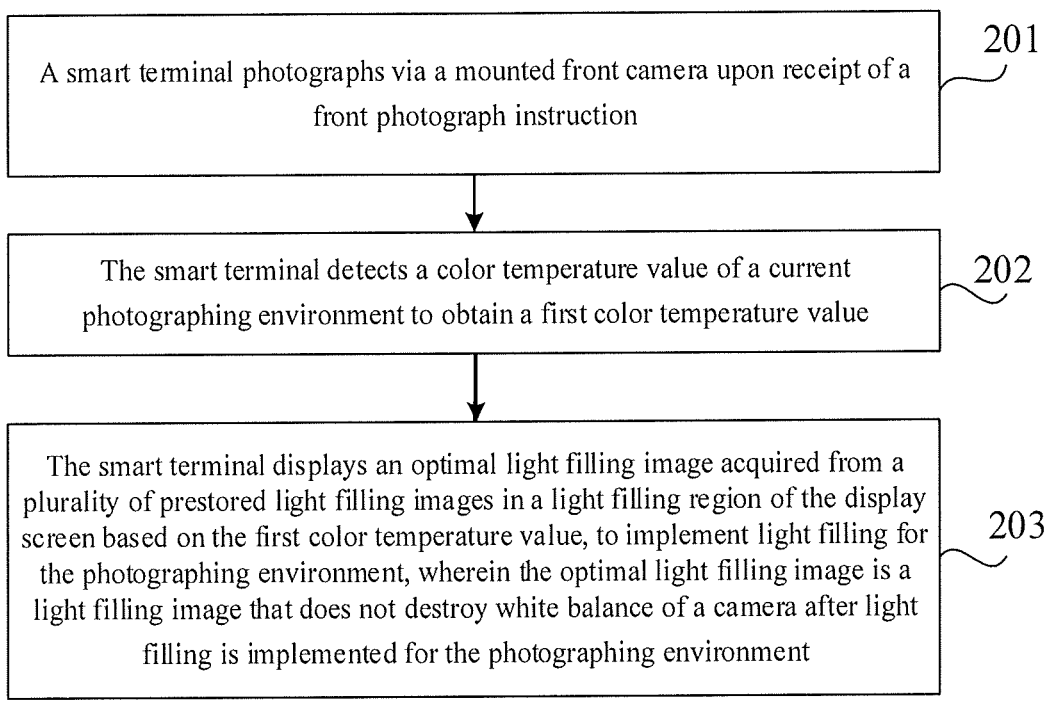
FIG. 2 is a flowchart of another light filling method for a photographing environment according to an exemplary aspect of the resent disclosure.

FIG. 2 is a flowchart of a light filling method for a photographing environment according to an aspect of the present disclosure. Referring to FIG. 2, the method includes the following steps:

In step 201, upon receipt of a front photograph instruction, a smart terminal photographs via a mounted front camera.

It should be noted that the front photograph instruction is configured to enable the front camera mounted on the smart terminal, and the front photograph instruction may be triggered by a user via a specified operation in a plurality of scenarios. For example, when the user is carrying out video communication via an instant communication application installed on the smart terminal, the front photograph instruction may be trigged by a specified operation; or when the user is carrying out self-photographing via the camera mounted on the smart terminal, the front photograph instruction may also be triggered by a specified operation. The specified operation may be a tap operation, a swipe operation, a voice operation or the like.

In step 202, the smart terminal detects a color temperature value of a current photographing environment to obtain a first color temperature value.

When a user performs photographing via the front camera, the user is not always in a bright environment and sometimes may be in a dim environment. In this case, if the user continues photographing, ideal pictures may not be photographed. For example, the taken pictures are so dim that the user fails to identify the content in the pictures. Therefore, for the sake of ideal pictures, the smart terminal generally needs to detect the color temperature value of the current photographing environment, and the smart terminal may proactively detect the color temperature value of the current photographing environment or may passively detect the color temperature value of the current photographing environment.

The proactive detection by the smart terminal means that the smart terminal proactively detects the color temperature value of the current photographing environment via a sensor after receipt of the front photograph instruction. The passive detection by the smart terminal means that, when receiving a detect instruction during the photographing process via the front camera, the smart terminal detects the color temperature value of the current photographing environment upon receipt of the front photograph instruction.

It should be noted that the detect instruction is configured to detect the photographing environment, and the detect instruction may be triggered by the user via a specified operation.

Further, since the smart terminal may implement light filling for the photographing environment by using some regions of the display screen, after obtaining the first color temperature value by detecting the color temperature value of the current photographing environment, the smart terminal may also acquire a region size corresponding to the first color temperature value from a stored corresponding relationship between color temperature values and region sizes; and a light filling region with a size being the region size is set in the display screen.

Figure 3:
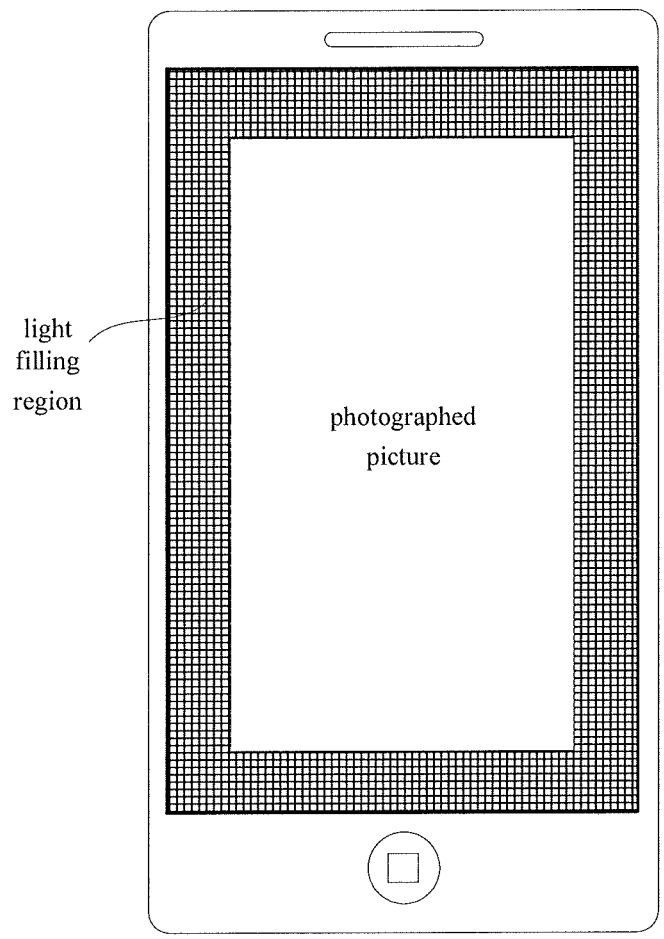
FIG. 3 is a schematic diagram of a light filling region according to an exemplary aspect of the resent disclosure.

For example, when the obtained first color temperature value is 4000 K (Kelvin), the region size corresponding to the first color temperature value, which is obtained from the corresponding relationship between color temperature values and region sizes as listed in Table 1, makes that a photographed picture is 1 cm distal from a non-display screen region in the horizontal direction on each innermost side and the photographed picture is 1 cm distal from the non-display screen region in the vertical direction on each innermost side. In this case, the smart terminal may set the light filling region with the size being the region size in the display screen, and the light filling region is the shadow area in FIG. 3, that is, the light filling region is between the non-display screen region and the photographed picture.

TABLE 1

| Color temperature value | Region size |
|---|---|
| 4000 K | 1 cm distal from a non-display screen region in the horizontal direction on each innermost side, and 1 cm distal from the non-display screen region in the vertical direction on each innermost side |
| 5000 K | 0 cm distal from a non-display screen region in the horizontal direction on each innermost side, and 1 cm distal from the non-display screen region in the vertical direction on each innermost side |
| . . . | . . . |

It should be noted that in the aspects of the present disclosure, description is given only by using the above corresponding relationship between color temperature values and region sizes as an example, which does not limit the aspects of the present disclosure.

In addition, the smart terminal may set different light filling regions with different region sizes according to different color temperature values; or the smart terminal may pre-set a light filling region with a default region size, and light filling is performed for the photographing environment based on the light filling region with the default region size in the display screen when light filling is desired.

In step 203, the smart terminal displays an optimal light filling image acquired from a plurality of prestored light filling images in a light filling region of the display screen based on the first color temperature value, to implement light filling for the photographing environment, wherein the optimal light filling image is a light filling image that does not destroy white balance of a camera after light filling is implemented for the photographing environment.

Since the photographed pictures may be yellowish or bluish after the white balance of the camera is destroyed during photographing, to ensure that the photographed pictures have normal tones, the optimal light filling image needs to be displayed in the light filling region of the display screen during light filling. The smart terminal may display the optimal light filling image from the prestored plurality of light filling images in the light filling region of the display screen based on the first color temperature value in the following three manners.

In a first manner, the smart terminal determines a light filling color temperature range corresponding to the first color temperature value; acquires any one light filling image with the color temperature value falling within the light filling color temperature range from the plurality of light filling images; displays the acquired light filling image in the light filling region, and detects the color temperature value of the photographing environment after displaying the acquired light filling image in the light filling region to obtain a second color temperature value; and when the second color temperature value does not match a target color temperature value, the smart terminal selects at least one light filling image not displayed in the light filling region during this light filling process from the plurality of light filling images, wherein the target color temperature value is a color temperature value that does not destroy the white balance of the camera; and acquires any one light filling image with the color temperature value falling within the light filling color temperature range from the selected light filling images, and returns to the operation of displaying the acquired light filling image in the light filling region, until the second color temperature value matches the target color temperature value.

It should be noted that when the color temperature value of the photographing environment is close to a color temperature value of an incandescent lamp, the white balance of the camera may not be destroyed. Therefore, the target color temperature value may be set to the color temperature value of the incandescent lamp. That is to say, the target color temperature value may be set to 5500 K. In addition, after light filling is performed for the photographing environment, the luminance of the photographing environment may change, however, the color temperature value of the photographing environment may not necessarily change. In addition, when the color temperature value of the photographing environment does not change, that is to say, when the color temperature value of the photographing environment before light filling is the same as the color temperature value of the photographing environment after light filling, the white balance of the camera may also be not destroyed. Therefore, the target color temperature value may also be set to the same as the first color temperature value of the photographing environment.

In normal conditions, since the color temperature value of a light filling image for light filling is generally not greatly different from the color temperature value of the photographing environment, and the smart terminal may store a large number of light filling images, a large amount of time may be consumed so that light filling may be performed at a low speed if all the images are displayed in the light filling region one by one. Therefore, the smart terminal may determine the light filling color temperature range corresponding to the first color temperature value from the stored corresponding relationship between color temperature values and light filling color temperature ranges. For example, when the first color temperature value is 4000 K, the smart terminal may determine that the light filling color temperature range corresponding to the first color temperature value 4000 K is 3000 K to 6000 K from the stored corresponding relationship between color temperature values and light filling color temperature ranges.

In addition, after any one light filling image with the color temperature value falling within the light filling color temperature range is displayed in the light filling region, the light filling region can achieve an effect of light filling for the photographing environment. However, it may not be ensured that light filling does not destroy the white balance of the camera in this case. Therefore, to ensure that the white balance of the camera is not destroyed, the smart terminal may detect the color temperature value of the photographing environment after light filling to obtain the second color temperature value, and determine that light filling may not destroy the white balance of the camera when the second color temperature value matches the target color temperature value and thus determine that light filling is completed for the photographing environment. When the second color temperature value does not match the target color temperature value, the smart terminal continues to select any one light filling image with the color temperature value falling within the light filling color temperature range from the selected light filling images, and returns to the operation of displaying the acquired light filling image in the light filling region, until the second color temperature value matches the target color temperature value.

In the aspect of the present disclosure, the second color temperature value matching the target color temperature value may mean that the second color temperature value is the same as the target color temperature value. Therefore, after the second color temperature value is detected, whether the second color temperature value is the same as the target color temperature value may be judged. When the second color temperature value is the same as the target color temperature value, it is determined that the second color temperature value matches the target color temperature value. When the second color temperature value is not the same as the target color temperature value, it is determined that the second color temperature value does not match the target color temperature value.

For example, when the first color temperature value is 4000 K and the target color temperature value is set to be the same as the first color temperature value, the smart terminal may determine that the light filling color temperature range corresponding to the first color temperature value 4000 K is 3000 K to 6000 K. Afterwards, the smart terminal acquires any one light filling image with the color temperature value falling within the light filling color temperature range 3000 K to 6000 K from the plurality of light filling images. The smart terminal displays the acquired light filling image in the light filling region, and detects the color temperature value of the photographing environment after displaying the acquired light filling image in the light filling region. When the second color temperature value obtained is 4000 K, the smart terminal determines that the second color temperature value matches the target color temperature value. In this case, it is determined that light filling is completed for the photographing environment. When the second color temperature value is 6000 K, the smart terminal determines that the second color temperature does not match the target color temperature value. In this case, the smart terminal continues to select any one light filling image with the color temperature value falling within the light filling color temperature range from the selected light filling images, and returns to the operation of displaying the acquired light filling image in the light filling region, until the second color temperature matches the target color temperature value.

Further, sometimes it is difficult to ensure that the second color temperature value is the same as the target color temperature value absolutely, and the white balance of the camera is nearly not destroyed when the second color temperature value is slightly different from the target color temperature value. Therefore, the second color temperature value matching the target color temperature value not only means that the second color temperature value is the same as the target color temperature value, but also could be another form of match. For example, the smart terminal may acquire a color temperature difference between the second color temperature value and the target color temperature value. When the color temperature difference is less than or equal to a predefined difference, it is determined that the second color temperature value matches the target color temperature value. When the color temperature difference is greater than the predefined difference, it is determined that the second color temperature value does not match the target color temperature value.

It should be noted that the predefined difference may be set in advance. For example, the predefined difference may be 100 k, 200 K, 300 K or the like.

In addition, since the color temperature difference between the second color temperature value and the target color temperature value can determine whether the second color temperature value matches the target color temperature value, when setting the target color temperature value, the target color temperature value may be set to be the same as the first color temperature value, or the target color temperature value may also be set to a color temperature value of an incandescent lamp, or the target color temperature value may also be set to a color temperature value that is slightly different from the first color temperature value. For example, when the first color temperature value is 4000 K, the target color temperature value may be set to 3900 K or 4100 K or the value alike.

In a second manner, the smart terminal acquires a first light filling image from a plurality of light filling images, wherein the first light filling image refers to any one light filling image of the plurality of light filling images; displays the first light filling image in the light filling region as a target light filling image, and detects the color temperature value of the photographing environment to obtain the second color temperature value after displaying the target light filling image in the light filling region; acquires a second light filling image from the plurality of light filling images by means of interpolation based on the second color temperature value, a target color temperature value and a color temperature value of the target light filling image, when the second color temperature value does not match the target color temperature value, wherein a color temperature value of the second light filling image is not equal to the color temperature value of the target light filling image, and the target color temperature value is a color temperature that does not destroy the white balance of the camera; and displays the second light filling image in the light filling region as the target light filling image, and returns to the operation of detecting the color temperature value of the photographing environment after displaying the target light filling image in the light filling region, until the second color temperature value matches the target color temperature value.

During light filling of the smart terminal, many cases may occur. For example, the color temperature value of the photographing environment before light filling may be always greater than or always less than the color temperature value of the photographing environment after light filling, or may be greater than the color temperature value of the photographing environment after light filling for a while and less than the color temperature value of the photographing environment after light filling for a while. Therefore, the operation of light filling for the photographing environment performed by the smart terminal in the second manner may include the following six cases.

In a first case, when the second color temperature value does not match the target color temperature value and the second color temperature value is always greater than the target color temperature value, the smart terminal acquires the second light filling image from the plurality of light filling images, wherein the color temperature value of the second light filling image is less than the color temperature value of the target light filling image. Afterwards, the smart terminal may perform the operation of displaying the second light filling image in the light filling region as the target light filling image, and return to the operation of detecting the color temperature value of the photographing environment after displaying the target light filling image in the light filling region, until the second color temperature value matches the target color temperature value.

For example, when the first color temperature value is 4000 K, the target color temperature value is set to 4100 K, and the color temperature value of the first light filling image is 5500 K, after the first light filling image is displayed in the light filling region as the target light filling image, when the second color temperature value obtained is 5000 K, a light filling image with a smaller color temperature value is desired for light filling since the color temperature value of the photographing environment is over-high when the light filling image with the color temperature value of 5500 K is used for light filling. In this case, the smart terminal may acquire a second light filling image with the color temperature value being less than 5500 K from the plurality of light filling images. For example, a second light filling image with the color temperature value 5000 K is acquired. Afterwards, after the second light filling image is displayed in the light filling region as the target light filling image, when the second color temperature value obtained is 4500 K, the smart terminal needs to continuously acquire a second light filling image with the color temperature value being less than 5000 K from the plurality of light filling images, and performs the operation of displaying the second light filling image in the light filling region as the target light filling, and returns to the operation of detecting the color temperature value of the photographing environment after displaying the target light filling image in the light filling region, until the second color temperature value matches the target color temperature value.

In a second case, a branch of the first case is described. That is, when it is determined that the second color temperature value detected is less than the target color temperature value after the second light filling image is displayed in the light filling region as the target light filling image, the smart terminal may acquire a third light filling image from the plurality of light filling images, wherein a color temperature value of the third light filling image is greater than the color temperature value of the target light filling image and less than a color temperature value of a first reference light filling image, and the first reference light filling image is a light filling image with the color temperature value greater than the color temperature value of the target light filling images and with a color temperature difference from the color temperature value of the target light filling image being the minimum in the light filling images acquired during this light filling process; and displays the third light filling image in the light filling region as the target light filling image, and returns to the operation of detecting the color temperature value of the photographing environment after displaying the target light filling image in the light filling region, until the second color temperature value matches the target color temperature value.

For example, when the first color temperature value is 4000 K, the target color temperature value is set to 4100 K, and the color temperature value of the first light filling image is 5500 K, the smart terminal may acquire a second light filling image with the color temperature value being less than 5500 K from the plurality of light filling images if the second color temperature value obtained is 5000 K after the first light filling image is displayed in the light filling region as the target light filling image. For example, a second light filling image with the color temperature value 3000 K is acquired. Afterwards, after the second light filling image is displayed in the light filling region as the target light filling image, if the second color temperature value obtained is 3500 K, it indicates that when light filling is performed by using the light filling image with the color temperature value 3000 K, the color temperature value of the photographing environment after light filling is over-low. Therefore, a light filling image with a greater color temperature value but not exceeding 5500 K is desired for light filling. In this case, the smart terminal may determine a light filling image with a color temperature value of 5500 K as the first reference light filling image, and acquire a third light filling image with the color temperature value being less than the color temperature value (5500 K) of the first reference light filling image and being greater than the color temperature value (3000 K) of the target light filling image from the plurality of light filling images. For example, the smart terminal acquires a third light filling image with a color temperature value of 4500 K, displays the third light filling image in the light filling region as the target light filling image, and returns to the operation of detecting the color temperature value of the photographing environment after displaying the target light filling image in the light filling region, until the second color temperature value matches the target color temperature value.

In a third case, a branch of the second case is described. When it is determined that the second color temperature value detected is greater than the target color temperature value after the third light filling image is displayed in the light filling region as the target light filling image, the smart terminal may acquire a fourth light filling image from the plurality of light filling images, wherein a color temperature value of the fourth light filling image is less than the color temperature value of the target light filling image and greater than a color temperature value of a second reference light filling image, and the second reference light filling image is a light filling image with a color temperature value less than the color temperature value of the target light filling images and with a color temperature difference from the color temperature value of the target light filling image being the minimum in the light filling images acquired during this light filling process; the smart terminal displays the fourth light filling image in the light filling region as the target light filling image, and detects the color temperature value of the photographing environment to obtain a third color temperature value after displaying the target light filling image in the light filling region; and, when the third color temperature value is greater than the target color temperature value, the smart terminal returns to the operation of acquiring the fourth light filling image from the plurality of light filling images, until the third color temperature value matches the target color temperature value.

For example, when the first color temperature value is 4000 K, the target color temperature value is set to 4100 K, and the color temperature value of the first light filling image is 5500 K, the smart terminal may acquire a second light filling image with the color temperature value being less than 5500 K from the plurality of light filling images if the second color temperature value obtained is 5000 K after the first light filling image is displayed in the light filling region as the target light filling image. For example, a second light filling image with the color temperature value 3000 K is acquired. Afterwards, after the second light filling image is displayed in the light filling region as the target light filling image, when the second color temperature value obtained is 3500 K, the smart terminal may determine a light filling image with the color temperature value 5500 K as the first reference light filling image, and acquire the third light filling image with the color temperature value being less than the color temperature value of the first reference light filling image and being greater than the color temperature value of the target light filling image from the plurality of light filling images. For example, a third light filling image with a color temperature value 4500 K is acquired, and the third light filling image is displayed in the light filling region as the target light filling image. When the second color temperature value detected is 4300 K, it indicates that the color temperature value of the photographing environment after light filling is greater after the light filling image with the color temperature value of 4500 K is displayed in the light filling region. Therefore, a light filling image with a smaller color temperature value not less than 3000 K is desired for light filling. In this case, the smart terminal may determine a light filling image with the color temperature value of 3000 K as the second reference light filling image, and acquire a fourth light filling image with a color temperature value being less than the color temperature value (4500 K) of the target light filling image and being greater than the color temperature value (3000 K) of the second reference light filling image from the plurality of light filling images. For example, the smart terminal acquires a fourth light filling image with the color temperature value 4300 K; displays the fourth light filling image in the light filling region as the target light filling image; and detects the color temperature value of the photographing environment after displaying the target light filling image in the light filling region. When the third temperature value obtained is 4200 K, the smart terminal continues to return to the operation of acquiring the fourth light filling image from the plurality of light filling images, until the third color temperature value matches the target color temperature value.

In a fourth case, an opposite case against the first case is given. When the second color temperature value does not match the target color temperature value and the second color temperature value is always less than the target color temperature value, the smart terminal acquires a fifth light filling image from the plurality of light filling images, wherein a color temperature value of the fifth light filling image is greater than the color temperature value of the target light filling image; and displays the fifth light filling image in the light filling region as the target light filling image, and returns to the operation of detecting the color temperature value of the photographing environment after displaying the target light filling image in the light filling region, until the second color temperature value matches the target color temperature value.

For example, when the first color temperature value is 4000 K, the target color temperature value is set to 4100 K, and the color temperature value of the first light filling image is 2000 K, after the first light filling image is displayed in the light filling region as the target light filling image, if the second color temperature value obtained is 3000 K, a light filling image with a greater color temperature value is desired for light filling since it indicates that the color temperature value of the photographing environment is too low when the light filling image with the color temperature value 2000 K is used for light filling. In this case, the smart terminal may acquire a fifth light filling image with the color temperature value being greater than 2000 K from the plurality of light filling images. For example, a fifth light filling image with the color temperature value of 3000 K is acquired. Afterwards, after the fifth light filling image is displayed in the light filling region as the target light filling image, if the second color temperature value obtained is 3500 K, the smart terminal may acquire a fifth light filling image with the color temperature value being greater than 2000 K from the plurality of light filling images, and perform the operation of displaying the fifth light filling image in the light filling region as the target light filling image, and return to the operation of detecting the color temperature value of the photographing environment after displaying the target light filling image in the light filling region, until the second color temperature value matches the target color temperature value.

In a fifth case, a branch of the fourth case is described. When it is determined that the second color temperature value detected is greater than the target color temperature value after the fifth light filling image is displayed in the light filling region as the target light filling image, the smart terminal may acquire a sixth light filling image from the plurality of light filling images, wherein a color temperature value of the sixth light filling image is less than the color temperature value of the target light filling image and greater than a color temperature value of a third reference light filling image, wherein the third reference light filling image is a light filling image with a color temperature value less than the color temperature of the target light filling images and with a color temperature difference from the color temperature value of the target light filling image being the minimum in the light filling images acquired during this light filling process; and display the sixth light filling image in the light filling region as the target light filling image, and returns to the operation of detecting the color temperature value of the photographing environment after displaying the target light filling image in the light filling region, until the second color temperature value matches the target color temperature value.

For example, when the first color temperature value is 4000 K, the target color temperature value is set to 4100 K, and the color temperature value of the first light filling image is 2000 K, the smart terminal may acquire a fifth light filling image with the color temperature value being greater than 2000 K from the plurality of light filling images when the second color temperature value obtained is 3000 K after the first light filling image is displayed in the light filling region as the target light filling image. For example, a fifth light filling image with the color temperature value 6000 K is acquired. Afterwards, after the fifth light filling image is displayed in the light filling region as the target light filling image, if the second color temperature value obtained is 4500 K, it indicates that when light filling is performed by using the light filling image with the color temperature value 6000 K, the color temperature value of the photographing environment after light filling is too high. Therefore, a light filling image with a small color temperature value not less than 2000 K is desired for light filling. In this case, the smart terminal may determine the first light filling image (with the color temperature value of 2000 K) as the third reference light filling image, and acquire a sixth light filling image with the color temperature value being greater than the color temperature value (2000 K) of the third reference light filling image and being less than the color temperature value (6000 K) of the target light filling image from the plurality of light filling images. For example, a sixth light filling image with a color temperature value 5000 K is acquired. The smart terminal may display the sixth light filling image in the light filling region as the target light filling image, and returns to the operation of detecting the color temperature value of the photographing environment after displaying the target light filling image in the light filling region, until the second color temperature value matches the target color temperature value.

In a sixth case, a branch of the fifth case is described. When it is determined that the second color temperature value detected is less than the target color temperature value after the sixth light filling image is displayed in the light filling region as the target light filling image, the smart terminal may acquire a seventh light filling image from the plurality of light filling images, wherein a color temperature value of the seventh light filling image is greater than the color temperature value of the target light filling image and less than a color temperature value of a fourth reference light filling image, and the fourth reference light filling image is a light filling image with the color temperature value greater than the color temperature of the target light filling images and with a color temperature difference from the color temperature value of the target light filling image being the minimum in the light filling images acquired during this light filling process; display the seventh light filling image in the light filling region as the target light filling image, and detects the color temperature value of the photographing environment to obtain a fourth color temperature value after displaying the target light filling image in the light filling region; and when the fourth color temperature value is less than the target color temperature value, return to the operation of acquiring the seventh light filling image from the plurality of light filling images, until the fourth color temperature value matches the target color temperature value.

For example, when the first color temperature value is 4000 K, the target color temperature value is set to 4100 K, and the color temperature value of the first light filling image is 2000 K, the smart terminal may acquire a fifth light filling image with the color temperature value being greater than 2000 K from the plurality of light filling images when the second color temperature value obtained is 3000 K after the first light filling image is displayed in the light filling region as the target light filling image. For example, a fifth light filling image with the color temperature value of 6000 K is acquired. Afterwards, after the fifth light filling image is displayed in the light filling region as the target light filling image, when the second color temperature value obtained is 4500 K, the smart terminal may determine a light filling image with the color temperature value 2000 K as the third reference light filling image, and acquire a sixth light filling image with a color temperature value being greater than the color temperature value (2000 K) of the third reference light filling image and being less than the color temperature value (6000) of the target light filling image from the plurality of light filling images. For example, a sixth light filling image with a color temperature value 3000 K may be acquired, and the second color temperature value that has been detected is 3500 K after the smart terminal displays the sixth light filling image in the light filling region as the target light filling image. It indicates that when light filling is performed by using a light filling image with the color temperature value of 3000 K, the color temperature value of the photographing environment after light filling is too low. Therefore, a light filling image with a greater color temperature value of not exceeding 6000 K is desired for light filling. The smart terminal uses a light filling image with the color temperature value of 6000 K as a fourth reference light filling image, and acquires a seventh light filling image with a color temperature being greater than the color temperature value (3000 K) of the target light filling image and being less than the color temperature value (6000 K) of the fourth reference light filling image from the plurality of light filling images. For example, a seventh light filling image with the color temperature value 4000 K. is acquired. The smart terminal displays the seventh light filling image in the light filling region as the target light filling image, and detects the color temperature value of the photographing environment after displaying the target light filling image in the light filling region. When the fourth color temperature value obtained is 3700 K, the smart terminal returns to the operation of acquiring the seventh light filling image from the plurality of light filling images, until the fourth color temperature value matches the target color temperature value.

In a third manner, the smart terminal displays a plurality of light filling images; displays a light filling image selected based on the select instruction in the light filling region, and detects the color temperature value of the photographing environment to obtain a second color temperature value after displaying the light filling image selected based on the select instruction, upon receipt of a select instruction based on the plurality of light filling images; displays prompt information when the second color temperature value does not match a target color temperature value, wherein the prompt information is used to prompt re-choice of the light filling image; and returns to the operation of displaying the plurality of light filling images, until the second color temperature value matches the target color temperature value, upon receipt of a re-choose instruction.

Since the image displayed in the light filling region is chosen by a user, and the image chosen by the user may be not an optimal light filling image. For the sake of not destroying the white balance of the camera, after the smart terminal displays the light filling image chosen by the user in the light filling region, if the detected second color temperature value does not match the target color temperature value, the smart terminal may display the prompt information to notify the user that the light filling image chosen by the user is not suitable for light filling.

It should be noted that the choose instruction is configured to choose an image to be displayed in the light filling region from the plurality of light filling images, and the choose instruction may be triggered by the user via a specified operation. A re-choose instruction is configured to re-choose a light filling image to be displayed in the light filling region from the plurality of light filling images, and the re-choose instruction may be triggered by the user via a specified operation as well.

To enable the user to clearly acknowledge which light filling images of the plurality of light filling images have been displayed in the light filling region, the smart terminal may mark the light filling images that have been displayed. For example, color of the light filling images that have been displayed may be turned into gray, or the light filling images that have been displayed may be marked with ticks, letters, flags or the markers alike.

In addition, since the user may not care whether the white balance of the camera is destroyed, the smart terminal may receive a choose cancel instruction. In this case, the smart terminal may determine that this light filling process is completed.

In the aspect of the present disclosure, the smart terminal may detect the color temperature value of the photographing environment to obtain the first color temperature value during the photographing process of the front camera, acquire the optimal light filling image based on the first color temperature value, and display the optimal light filling image in the light filling region of the display screen. Since the optimal light filling image is the light filling image that does not destroy the white balance of the camera after light filling is implemented for the photographing environment, after the optimal light filling image is displayed in the light filling region, light filling is implemented for the photographing environment, and the accuracy of light filling for the environment is improved. In the meanwhile, the white balance of the camera may not be destroyed. Further, the optimal light filling image may be directly displayed in the light filling region with no need to increasing other devices, thereby reducing the cost of light filling.

Figure 4:
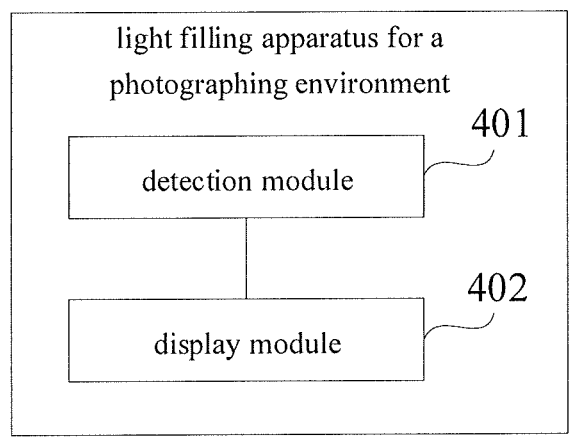
FIG. 4 is a block diagram of a light filling apparatus for a photographing environment according to an exemplary aspect of the resent disclosure.

FIG. 4 is a block diagram of a light filling apparatus for a photographing environment according to an exemplary aspect. Referring to FIG. 4, the light filling apparatus is applied in a smart terminal, and the smart terminal control device can be implemented by software, hardware, or a combination thereof. The apparatus includes: a detection module 401 and a display module 402.

The detection module 401 is configured to detect a color temperature value of a current photographing environment to obtain a first color temperature value.

The display module 402 is configured to display an optimal light filling image acquired from a plurality of prestored light filling images in a light filling region of a display screen based on the first color temperature value, to implement light filling for the photographing environment, wherein the optimal light filling image is a light filling image that does not destroy white balance of a camera after light filling is implemented for the photographing environment.

Figure 5:
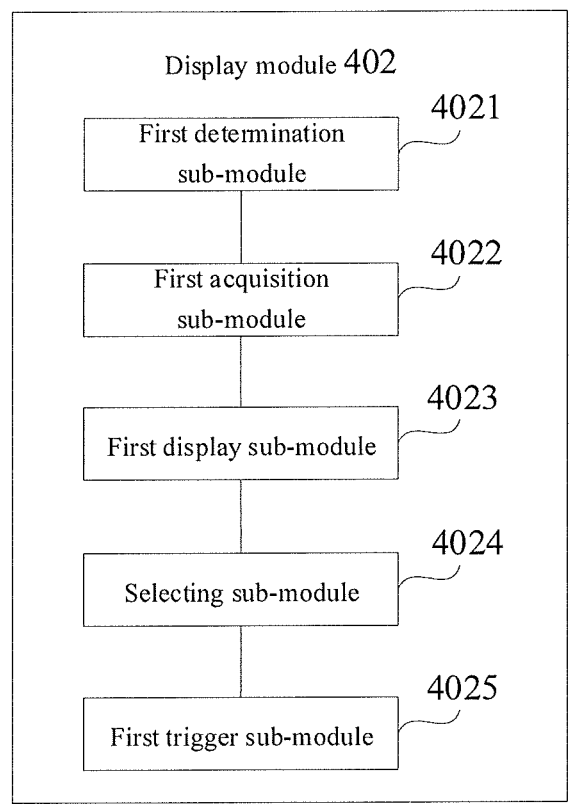
FIG. 5 is a block diagram of a first display module according to an exemplary aspect of the resent disclosure.

In some aspects, referring to FIG. 5, the display module 402 includes:

a first determination sub-module 4021 configured to determine a light filling color temperature range corresponding to the first color temperature value;

a first acquisition sub-module 4022 configured to acquire any one light filling image with the color temperature value falling within the light filling color temperature range from the plurality of light filling images;

a first display sub-module 4023 configured to display the acquired light filling image in the light filling region, and detect the color temperature value of the photographing environment to obtain a second color temperature value after displaying the acquired light filling image in the light filling region;

a selecting sub-module 4024 configured to select at least one light filling image not displayed in the light filling region in the light filling process from the plurality of light filling images when the second color temperature value does not match a target color temperature value, wherein the target color temperature value is a color temperature value that does not destroy the white balance of the camera; and a first trigger sub-module 4025 configured to acquire any one light filling image with the color temperature value falling within the light filling color temperature range from the selected light filling images, and trigger the first display sub-module to display the acquired light filling image in the light filling region, until the second color temperature value matches the target color temperature value.

Figure 6:
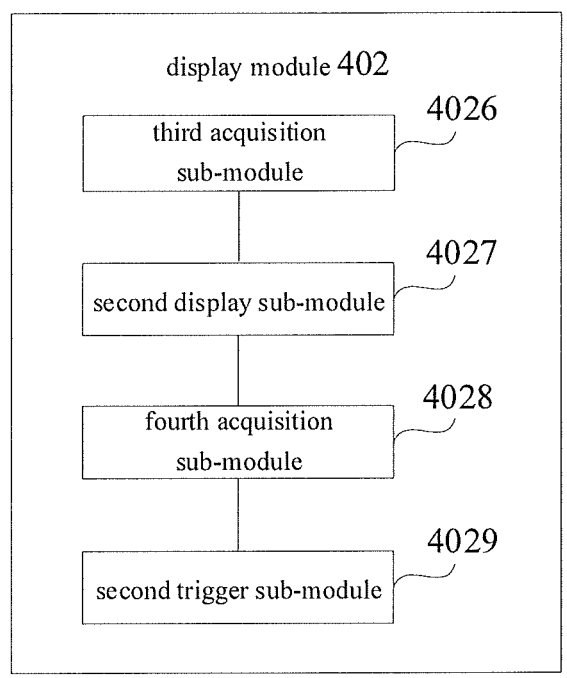
FIG. 6 is a block diagram of a first display module according to an exemplary aspect of the resent disclosure.

In some aspects, referring to FIG. 6, the display module 402 includes:

a third acquisition sub-module 4026 configured to acquire a first light filling image from the plurality of light filling images, wherein the first light filling image is any one light filling image of the plurality of light filling images;

a second display sub-module 4027 configured to display the first light filling image in the light filling region as a target light filling image, and detect the color temperature value of the photographing environment to obtain a second color temperature value after displaying the target light filling image in the light filling region;

a fourth acquisition sub-module 4028 configured to acquire a second light filling image from the plurality of light filling images by means of interpolation based on the second color temperature value, a target color temperature value and a color temperature value of the target light filling image when the second color temperature value does not match the target color temperature value, wherein a color temperature value of the second light filling image is not equal to the color temperature value of the target light filling image, and the target color temperature value is a color temperature value that does not destroy the white balance of the camera; and a second trigger sub-module 4029 configured to display the second light filling image in the light filling region as the target light filling image, and trigger the second display sub-module to detect the color temperature value of the photographing environment after displaying the target light filling image in the light filling region, until the second color temperature value matches the target color temperature value.

Figure 7:
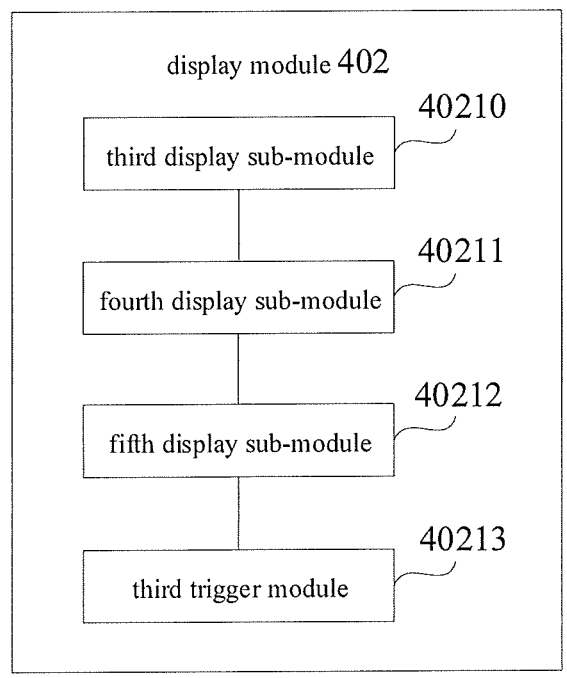
FIG. 7 is a block diagram of a first display module according to an exemplary aspect of the resent disclosure.

In some aspects, referring to FIG. 7, the display module 402 includes:

a third display sub-module 40210 configured to display the plurality of light filling images;

a fourth display sub-module 40211 configured to display a light filling image selected based on the select instruction in the light filling region, and detect the color temperature value of the photographing environment to obtain a second color temperature value after displaying the light filling image selected based on the select instruction, upon receipt of a select instruction based on the plurality of light filling images;

a fifth display sub-module 40212 configured to display prompt information when the second color temperature value does not match a target color temperature value, wherein the prompt information is used to prompt re-choice of the light filling image, and the target color temperature value is a color temperature that does not destroy the white balance of the camera; and a third trigger module 40213 configured to trigger the third display sub-module to display the plurality of light filling images, until the second color temperature value matches the target color temperature value, upon receipt of a re-choose instruction.

In some aspects, the display module 402 is further configured to:

acquire a color temperature value difference between the second color temperature value and the target color temperature value;

determine that the second color temperature value matches the target color temperature value when the color temperature value difference is less than or equal to a predefined difference; and determine that the second color temperature value does not match the target color temperature value when the color temperature value difference is greater than the predefined difference.

Figure 8:
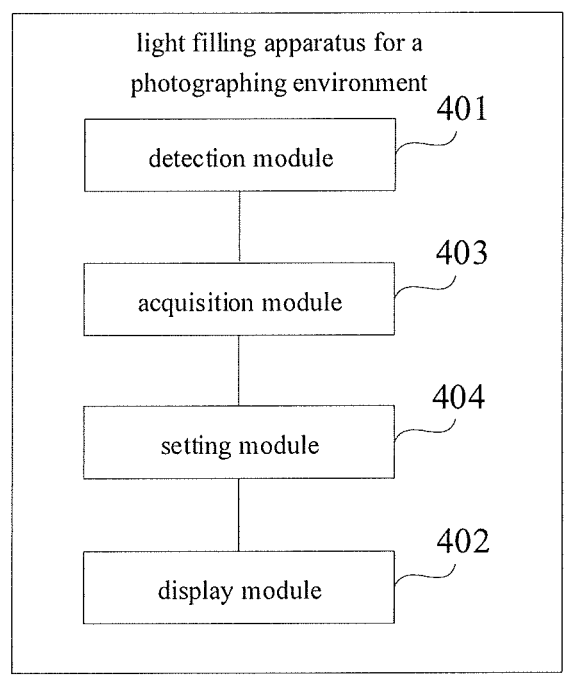
FIG. 8 is a block diagram of a light filling apparatus for a photographing environment according to an exemplary aspect of the resent disclosure.

In some aspects, referring to FIG. 8, the apparatus further includes:

an acquisition module 403 configured to acquire a region size corresponding to the first color temperature value from a stored corresponding relationship between color temperature values and region sizes; and a setting module 404 configured to set a light filling region with a size being the region size in the display screen.

In the aspect of the present disclosure, the smart terminal may detect the color temperature value of the photographing environment to obtain the first color temperature value during the process of photographing with the front camera, acquire the optimal light filling image based on the first color temperature value, and display the optimal light filling image in the light filling region of the display screen. Since the optimal light filling image is the light filling image that does not destroy the white balance of the camera after light filling is implemented for the photographing environment, after the optimal light filling image is displayed in the light filling region, light filling is implemented for the photographing environment, and the accuracy of light filling for the environment is improved, in the meanwhile, the white balance of the camera may not be destroyed. Further, the optimal light filling image may be directly displayed in the light filling region with no need to increasing other devices, thereby reducing the cost of light filling.

Figure 9:
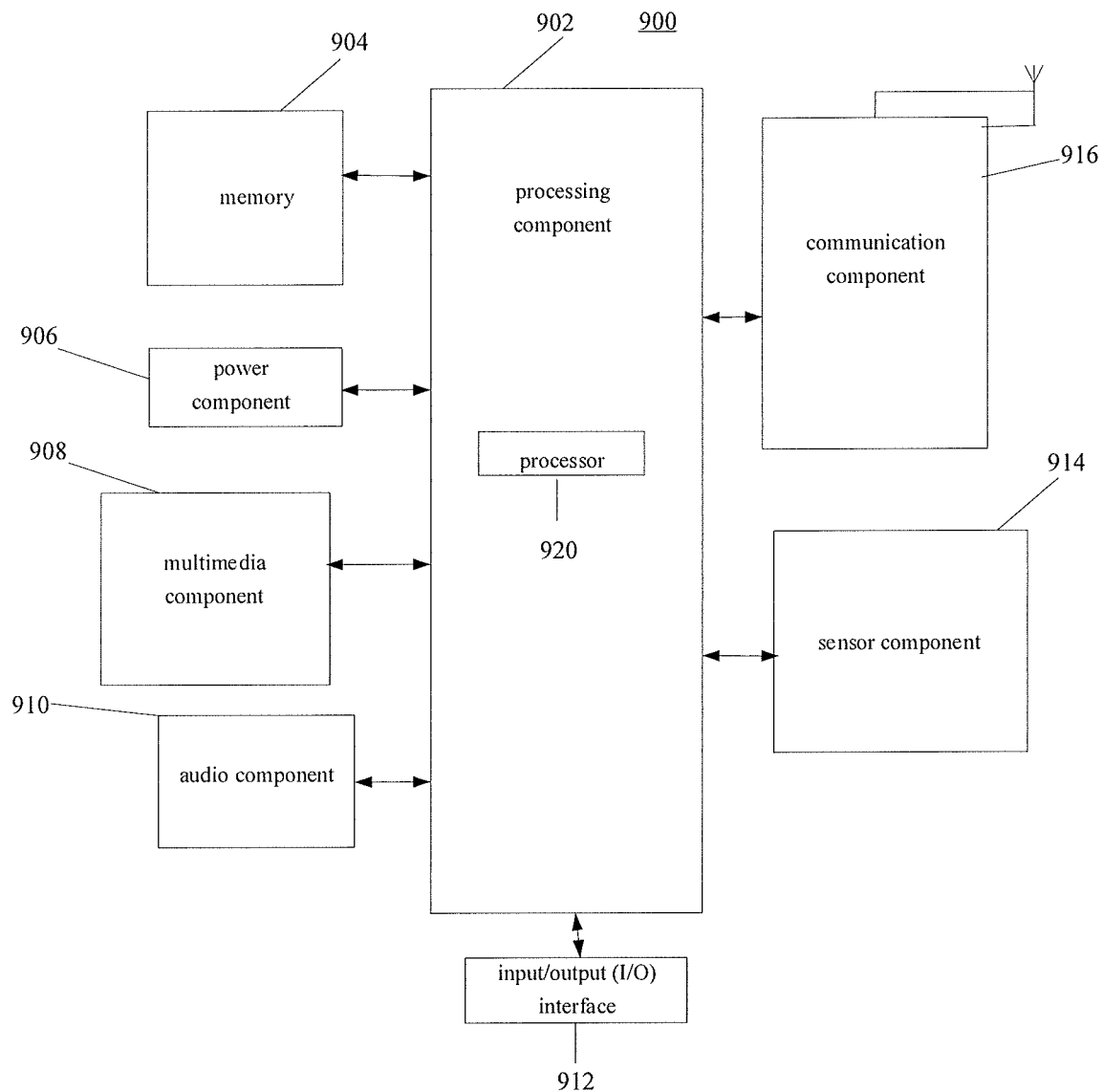
FIG. 9 is a block diagram of a smart terminal according to an exemplary aspect of the resent disclosure.

FIG. 9 is a block diagram of a smart terminal 900 according to an exemplary aspect. For example, the smart terminal 900 may be a mobile phone, a computer, a digital broadcast terminal, a messaging device, a gaming console, a tablet, a medical device, exercise equipment, a personal digital assistant, and the like.

Referring to FIG. 9, the smart terminal 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the smart terminal 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the smart terminal 900. Examples of such data include instructions for any applications or methods operated on the smart terminal 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the smart terminal 900. The power component 906 may include a power management system, one or more power sources, and any other components associated with the generation, management, and distribution of power in the smart terminal 900.

The multimedia component 908 includes a screen providing an output interface between the smart terminal 900 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 908 includes a front camera and/or a rear camera. The front camera and the rear camera may receive an external multimedia datum while the smart terminal 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone ("MIC") configured to receive an external audio signal when the smart terminal 900 is in an operation mode, such as a call mode, a recording mode, and a voice recognition mode. The received audio signal may be further stored in the memory 904 or transmitted via the communication component 916. In some aspects, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the smart terminal 900. For instance, the sensor component 914 may detect an open/closed status of the smart terminal 900, relative positioning of components, e.g., the display and the keypad, of the smart terminal 900, a change in position of the smart terminal 900 or a component of the smart terminal 900, a presence or absence of user contact with the smart terminal 900, an orientation or an acceleration/deceleration of the smart terminal 900, and a change in temperature of the smart terminal 900. The sensor component 914 may include a proximity sensor configured to detect the presence of nearby objects without any physical contact. The sensor component 914 may also include a light sensor, such as a CMOS or CCD image sensor, for use in imaging applications. In some aspects, the sensor component 914 may also include an accelerometer sensor, a gyroscope sensor, a magnetic sensor, a pressure sensor, or a temperature sensor.

The communication component 916 is configured to facilitate communication, wired or wirelessly, between the smart terminal 900 and other devices. The smart terminal 900 can access a wireless network based on a communication standard, such as WiFi, 2G, or 3G, or a combination thereof. In one exemplary aspect, the communication component 916 receives a broadcast signal or broadcast associated information from an external broadcast management system via a broadcast channel. In one exemplary aspect, the communication component 916 further includes a near field communication (NFC) module to facilitate short-range communications.

In exemplary aspects, the smart terminal 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method shown in FIG. 1 or FIG. 2.

There is provided a non-transitory computer-readable storage medium having instructions stored therein. The instructions, when executed by a processor of the smart terminal, cause the smart terminal to perform the light filling method for a photographing environment shown in FIG. 1 or FIG. 2.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the present disclosure. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A light filling method for a photographing environment, comprising:
    detecting a color temperature value of a current photographing environment to obtain a first color temperature value;
    acquiring a region size corresponding to the first color temperature value from a stored corresponding relationship between color temperature values and region sizes;
    setting a light filling region with a size being the region size in a display screen; and
    displaying an optimal light filling image acquired from a plurality of light filling images in the light filling region of the display screen based on the first color temperature value, to implement light filling for the photographing environment,
    wherein the optimal light filling image is a light filling image that does not destroy white balance of a camera after light filling is implemented for the photographing environment.

2. The method according to claim 1, wherein displaying the optimal light filling image comprises:

determining a light filling color temperature range corresponding to the first color temperature value;

acquiring, from the plurality of light filling images, a light filling image with the color temperature value falling within the light filling color temperature range;

displaying the acquired light filling image in the light filling region, and detecting the color temperature value of the photographing environment to obtain a second color temperature value after displaying the acquired light filling image in the light filling region;

selecting at least one light filling image not displayed in the light filling region in a light filling process from the plurality of light filling images when the second color temperature value does not match a target color temperature value, wherein the target color temperature value is a color temperature value that does not destroy the white balance of the camera; and acquiring, from the selected at least one light filling image, a light filling image with the color temperature value falling within the light filling color temperature range, and returning to the operation of displaying the acquired light filling image in the light filling region, until the second color temperature value matches the target color temperature value.

3. The method according to claim 2, wherein after detecting the color temperature value of the photographing environment to obtain the second color temperature value, the method further comprises:

acquiring a color temperature value difference between the second color temperature value and the target color temperature value;

determining that the second color temperature value matches the target color temperature value when the color temperature value difference is less than or equal to a predefined difference; and determining that the second color temperature value does not match the target color temperature value when the color temperature value difference is greater than the predefined difference.

4. The method according to claim 1, wherein displaying the optimal light filling image comprises:

acquiring a first light filling image from the plurality of light filling images, wherein the first light filling image is any one light filling image of the plurality of light filling images;

displaying the first light filling image in the light filling region as a target light filling image, and detecting the color temperature value of the photographing environment to obtain a second color temperature value after displaying the target light filling image in the light filling region;

acquiring a second light filling image from the plurality of light filling images by means of interpolation based on the second color temperature value, a target color temperature value and a color temperature value of the target light filling image, when the second color temperature value does not match the target color temperature value, wherein a color temperature value of the second light filling image is not equal to the color temperature value of the target light filling image, and the target color temperature value is a color temperature value that does not destroy the white balance of the camera; and displaying the second light filling image in the light filling region as the target light filling image, and returning to the operation of detecting the color temperature value of the photographing environment after displaying the target light filling image in the light filling region, until the second color temperature value matches the target color temperature value.

5. The method according to claim 4, wherein after detecting the color temperature value of the photographing environment to obtain the second color temperature value, the method further comprises:

acquiring a color temperature value difference between the second color temperature value and the target color temperature value;

determining that the second color temperature value matches the target color temperature value when the color temperature value difference is less than or equal to a predefined difference; and determining that the second color temperature value does not match the target color temperature value when the color temperature value difference is greater than the predefined difference.

6. The method according to claim 1, wherein displaying the optimal light filling image comprises:

displaying the plurality of light filling images;

displaying a light filling image selected based on a select instruction in the light filling region, and detecting the color temperature value of the photographing environment to obtain a second color temperature value after displaying the selected light filling image based on the select instruction, upon receipt of the select instruction based on the plurality of light filling images;

displaying prompt information when the second color temperature value does not match a target color temperature value, wherein the prompt information is used to prompt re-choice of the light filling image, and the target color temperature value is a color temperature that does not destroy the white balance of the camera; and returning to the operation of displaying the plurality of light filling images, until the second color temperature value matches the target color temperature value, upon receipt of a re-choose instruction.

7. The method according to claim 6, wherein after detecting the color temperature value of the photographing environment to obtain the second color temperature value, the method further comprises:

acquiring a color temperature value difference between the second color temperature value and the target color temperature value;

determining that the second color temperature value matches the target color temperature value when the color temperature value difference is less than or equal to a predefined difference; and determining that the second color temperature value does not match the target color temperature value when the color temperature value difference is greater than the predefined difference.

8. A light filling apparatus for a photographing environment, comprising:

a processor; and a memory configured to store instructions executable by the processor;

wherein the processor is configured to:

detect a color temperature value of a current photographing environment to obtain a first color temperature value;

acquire a region size corresponding to the first color temperature value from a stored corresponding relationship between color temperature values and region sizes;

set a light filling region with a size being the region size in a display screen; and display an optimal light filling image acquired from a plurality of light filling images in the light filling region of the display screen based on the first color temperature value, to implement light filling for the photographing environment, wherein the optimal light filling image is a light filling image that does not destroy white balance of a camera after light filling is implemented for the photographing environment.

9. The apparatus according to claim 8, wherein the processor is further configured to:

determine a light filling color temperature range corresponding to the first color temperature value;

acquire, from the plurality of light filling images, a light filling image with the color temperature value falling within the light filling color temperature range;

display the acquired light filling image in the light filling region, and detect the color temperature value of the photographing environment to obtain a second color temperature value after displaying the acquired light filling image in the light filling region;

select at least one light filling image not displayed in the light filling region in a light filling process from the plurality of light filling images when the second color temperature value does not match a target color temperature value, wherein the target color temperature value is a color temperature value that does not destroy the white balance of the camera; and acquire, from the selected at least one light filling image, a light filling image with the color temperature value falling within the light filling color temperature range, and return to the operation of displaying the acquired light filling image in the light filling region, until the second color temperature value matches the target color temperature value.

10. The apparatus according to claim 9, wherein the processor is further configured to:

acquire a color temperature value difference between the second color temperature value and the target color temperature value;

determine that the second color temperature value matches the target color temperature value when the color temperature value difference is less than or equal to a predefined difference; and determine that the second color temperature value does not match the target color temperature value when the color temperature value difference is greater than the predefined difference.

11. The apparatus according to claim 8, wherein the processor is further configured to:

acquire a first light filling image from the plurality of light filling images, wherein the first light filling image is any one light filling image of the plurality of light filling images;

display the first light filling image in the light filling region as a target light filling image, and detect the color temperature value of the photographing environment to obtain a second color temperature value after displaying the target light filling image in the light filling region;

acquire a second light filling image from the plurality of light filling images by means of interpolation based on the second color temperature value, a target color temperature value and a color temperature value of the target light filling image, when the second color temperature value does not match the target color temperature value, wherein a color temperature value of the second light filling image is not equal to the color temperature value of the target light filling image, and the target color temperature value is a color temperature value that does not destroy the white balance of the camera; and display the second light filling image in the light filling region as the target light filling image, and return to the operation of detect the color temperature value of the photographing environment after displaying the target light filling image in the light filling region, until the second color temperature value matches the target color temperature value.

12. The apparatus according to claim 11, wherein the processor is further configured to:

acquire a color temperature value difference between the second color temperature value and the target color temperature value;

determine that the second color temperature value matches the target color temperature value when the color temperature value difference is less than or equal to a predefined difference; and determine that the second color temperature value does not match the target color temperature value when the color temperature value difference is greater than the predefined difference.

13. The apparatus according to claim 8, wherein the processor is further configured to:

display the plurality of light filling images;

display a light filling image selected based on a select instruction in the light filling region, and detect the color temperature value of the photographing environment to obtain a second color temperature value after displaying the selected light filling image based on the select instruction, upon receipt of the select instruction based on the plurality of light filling images;

display prompt information when the second color temperature value does not match a target color temperature value, wherein the prompt information is used to prompt re-choice of the light filling image, and the target color temperature value is a color temperature that does not destroy the white balance of the camera; and return to the operation of display the plurality of light filling images, until the second color temperature value matches the target color temperature value, upon receipt of a re-choose instruction.

14. The apparatus according to claim 13, wherein the processor is further configured to:

acquire a color temperature value difference between the second color temperature value and the target color temperature value;

determine that the second color temperature value matches the target color temperature value when the color temperature value difference is less than or equal to a predefined difference; and determine that the second color temperature value does not match the target color temperature value when the color temperature value difference is greater than the predefined difference.

15. A non-transitory computer-readable storage medium having stored therein instructions that, when executed by a processor, causes a device to perform a light filling method for a photographing environment, the method comprising:

detecting a color temperature value of a current photographing environment to obtain a first color temperature value;

acquiring a region size corresponding to the first color temperature value from a stored corresponding relationship between color temperature values and region sizes;

setting a light filling region with a size being the region size in a display screen; and displaying an optimal light filling image acquired from a plurality of light filling images in the light filling region of the display screen based on the first color temperature value, to implement light filling for the photographing environment, wherein the optimal light filling image is a light filling image that does not destroy white balance of a camera after light filling is implemented for the photographing environment.

16. The non-transitory computer-readable storage medium according to claim 15, wherein displaying the optimal light filling image comprises:

determining a light filling color temperature range corresponding to the first color temperature value;

acquiring, from the plurality of light filling images, a light filling image with the color temperature value falling within the light filling color temperature range;

displaying the acquired light filling image in the light filling region, and detecting the color temperature value of the photographing environment to obtain a second color temperature value after displaying the acquired light filling image in the light filling region;

selecting at least one light filling image not displayed in the light filling region in a light filling process from the plurality of light filling images when the second color temperature value does not match a target color temperature value, wherein the target color temperature value is a color temperature value that does not destroy the white balance of the camera; and acquiring, from the selected at least one light filling image, a light filling image with the color temperature value falling within the light filling color temperature range, and returning to the operation of displaying the acquired light filling image in the light filling region, until the second color temperature value matches the target color temperature value.

17. The non-transitory computer-readable storage medium according to claim 15, wherein displaying the optimal light filling image comprises:

acquiring a first light filling image from the plurality of light filling images, wherein the first light filling image is any one light filling image of the plurality of light filling images;

displaying the first light filling image in the light filling region as a target light filling image, and detecting the color temperature value of the photographing environment to obtain a second color temperature value after displaying the target light filling image in the light filling region;

acquiring a second light filling image from the plurality of light filling images by means of interpolation based on the second color temperature value, a target color temperature value and a color temperature value of the target light filling image, when the second color temperature value does not match the target color temperature value, wherein a color temperature value of the second light filling image is not equal to the color temperature value of the target light filling image, and the target color temperature value is a color temperature value that does not destroy the white balance of the camera; and displaying the second light filling image in the light filling region as the target light filling image, and returning to the operation of detecting the color temperature value of the photographing environment after displaying the target light filling image in the light filling region, until the second color temperature value matches the target color temperature value.

18. The non-transitory computer-readable storage medium according to claim 15, wherein displaying the optimal light filling image comprises:

displaying the plurality of light filling images;

displaying a light filling image selected based on a select instruction in the light filling region, and detecting the color temperature value of the photographing environment to obtain a second color temperature value after displaying the selected light filling image based on the select instruction, upon receipt of the select instruction based on the plurality of light filling images;

displaying prompt information when the second color temperature value does not match a target color temperature value, wherein the prompt information is used to prompt re-choice of the light filling image, and the target color temperature value is a color temperature that does not destroy the white balance of the camera; and returning to the operation of displaying the plurality of light filling images, until the second color temperature value matches the target color temperature value, upon receipt of a re-choose instruction.

\* \* \* \* \*